US008873048B2

(12) United States Patent
Florek et al.

(10) Patent No.: US 8,873,048 B2
(45) Date of Patent: Oct. 28, 2014

(54) SPECTROMETER ARRANGEMENT (75) Inventors: Stefan Florek, Berlin (DE); Michael Okruss, Potsdam (DE); Helmut Becker-Ross, Berlin (DE)

(73) Assignee: Leibniz—Institut für Analytische Wissenschaften—ISAS—e.V., Dortmund (DE)

( * ) Notice: Subject to any disclaimer, the term of this patent is extended or adjusted under 35 U.S.C. 154(b) by 8 days.

(21) Appl. No.: 13/518,797

(22) PCT Filed: Dec. 13, 2010

(86) PCT No.: PCT/EP2010/069472
§ 371 (c)(1),
(2), (4) Date: Jun. 22, 2012

(87) PCT Pub. No.: WO2011/076598
PCT Pub. Date: Jun. 3, 2011

(65) Prior Publication Data
US 2012/0262713 A1 Oct. 18, 2012

(30) Foreign Application Priority Data
Dec. 22, 2009 (DE) .................. 10 2009 059 280

(51) Int. Cl.
G01J 3/28 (2006.01)
G01J 3/02 (2006.01)
G01J 3/18 (2006.01)
G01J 3/14 (2006.01)

(52) U.S. Cl.
CPC ............. *G01J 3/1809* (2013.01); *G01J 3/0235* (2013.01); *G01J 3/02* (2013.01); *G01J 3/0208* (2013.01); *G01J 3/2803* (2013.01); *G01J 3/14* (2013.01); *G01J 2003/1828* (2013.01); *G01J 3/021* (2013.01)
USPC ....................................... 356/328

(58) Field of Classification Search
USPC .......................................... 356/328, 326, 334
See application file for complete search history.

(56) References Cited

U.S. PATENT DOCUMENTS

| 3,922,089 A | 11/1975 | Danielsson et al. |
| 5,414,540 A | 5/1995 | Patel et al. |
| 2001/0024275 A1* | 9/2001 | Suzuki et al. ................. 356/328 |
| 2003/0123880 A1 | 7/2003 | Boertjes et al. |

FOREIGN PATENT DOCUMENTS

| CN | 1656721 A | 8/2005 |
| CN | 101065979 A | 10/2007 |

(Continued)

OTHER PUBLICATIONS

Becker-Ross, et al.; "Echelle spectrometers and charge-coupled device"; Spectrochimica Acta Bart B 52, (1997) 1367-1375.

*Primary Examiner* — Abdullahi Nur
(74) *Attorney, Agent, or Firm* — Thorpe North & Western LLP (57) ABSTRACT A spectrometer assembly (10), comprising an Echelle grating (18; 46) for dispersing radiation entering the spectrometer assembly (10) in a main dispersion direction, and a dispersion assembly (16; 40) for dispersing a parallel radiation bundle generated from the radiation entering the spectrometer assembly in a lateral dispersion direction, is characterized in that the dispersion assembly (16; 40) is reflective, and the dispersion assembly (16; 40) is arranged relative to the Echelle grating (18; 46) in such a way that the parallel radiation bundle is reflected in the direction of the Echelle grating. The Echelle grating (18; 46) may be arranged in such a way that the dispersed radiation is reflected back to the dispersion assembly (16; 40).

12 Claims, 13 Drawing Sheets

(56) References Cited

FOREIGN PATENT DOCUMENTS

| | | |
|---|---|---|
| DE | 10011462 | 9/2001 |
| EP | 0403228 | 6/1990 |
| WO | WO 03/098856 A2 | 11/2003 |
| WO | WO 2011/076598 | 6/2011 |

* cited by examiner

SPECTROMETER ARRANGEMENT

This is a United States Nationalization of Patent Cooperation Treaty Application PCT/EP2010/069472 having an international filing date of 13 Dec. 2010, and in which the United States was specified. This application claims convention priority to German Application No. 10 2009 059 280.6 filed 22 Dec. 2009.

TECHNICAL FIELD

The invention relates to a spectrometer assembly, comprising:
a collimator optics for generating a parallel bundle of rays from radiation entering the spectrometer assembly,
a dispersion assembly for dispersing a parallel radiation bundle generated from the radiation entering the spectrometer assembly in a lateral dispersion direction, and.
an Echelle grating for dispersing radiation entering the spectrometer assembly in a main dispersion direction, and wherein the dispersion assembly is reflective, and the dispersion assembly is arranged along the optical path before the Echelle grating in such a way that parallel radiation bundle is reflected in the direction of the Echelle grating.
The invention further relates to a method for spectrally dispersing radiation comprising the steps of:
generating a parallel radiation bundle with a collimator optics;
dispersing the radiation with an Echelle grating in a main dispersion direction; and
dispensing the parallel radiation with a dispersing assembly in a lateral dispersion direction;
wherein the parallel radiation bundle is reflected by the dispersion assembly in the direction of the Echelle grating and passes the dispersion assembly once more.

In an Echelle spectrometer a grating with step-like cross section is used (Echelle (french)=stairs). Due to the step-like structure with a corresponding Blaze angle a diffraction pattern is generated which concentrates the diffracted radiation in high order, such as, for example, in thirtieth to one hundredth order. Thereby, high values for the dispersion and the spectral resolution can be obtained with a small assembly. The order can overlap—depending on the incident wavelength range. The orders in Echelle spectrometers with internal separation of the orders are, therefore, dispersed again in a direction which is lateral to the dispersion direction of the Echelle grating in order to separate the different ocurring orders in the focal plane. Thereby, a two-dimensional spectrum is obtained which can be detected with detector arrays.

An Echelle spectrometer with internal separation of the orders differs from Echelle spectrometers with external separation of the order in that the latter are illuminated only with radiation from a small wavelength range.

In spectrometers with internal separation of the orders the spectrum is generated in the form of a two-dimensional structure on the detector. Such structure essentially consists of parallel spectral sections having the length of one free spectral range of the Echelle grating. The use of a detector array with many detector elements enables simultaneous detection of a large wavelength range with high spectral resolution (spectrograph). If the spectrometer is used as a monochromator (Polychromator) radiation from a selected wavelength range is detected at an exit slit or a detector line in the range of the exit plane by rotating a grating and/or prism.

The lateral dispersion is generally selected such that all orders are overall completely separated. In order to ensure this over the entire spectral range there are spectral ranges where there is an unused gap between the individual orders. If a prism is used for generating the lateral dispersion larger gaps are generated in the spectral wavelength range with short wavelengths due to the dispersion dependency than in the spectral range with larger wavelengths. If a diffraction grating is used for the lateral dispersion this situation is reverse.

PRIOR ART

DE 41 18 760 A1 discloses a double Echelle monochromator with external separation of the orders. The light incident on the monochromator is reflected by a concave mirror to a prism. There, the light is pre-dispersed and reversed back essentially in itself to the mirror. With an intermediate slit a small spectral range is selected which enters a subsequent Echelle spectrometer. Another concave mirror is used to reflect the light to an Echelle grating. Radiation dispersed at the Echelle grating is also essentially reversed back in itself and is reflected with a small angle parallel to the incident radiation on a detector. The mirrors of the prior art assembly operate in autocollimation, which means that the collimator mirror also serves as a camera mirror.

DE 40 21 159 A1 discloses an Echelle polychromator where radiation is dispersed by an Echelle grating in a main dispersion direction and by a prism arranged before it in a lateral dispersion direction. Thereby a two-dimensional spectrum with a plurality of adjacent orders is generated in the exit plane. In order to avoid overlapping of the orders the height of the entrance slit and thereby the light throughput must be limited to a large extent.

There are assemblies where radiation is passed several times over an Echelle grating in order to obtain a higher resolution:

DE 199 61 908 C2 discloses an Echelle monochromator in Littrow assembly without separating the orders. Radiation entering the monochromator through the entrance slit is reflected by a collimator mirror in the direction of an Echelle grating. The Echelle grating is operated in two positions. In the first position the dispersed radiation is autocollimated and runs back over the mirror to the exit slit. In the second position the dispersed radiation is passed to a plane mirror and is then reflected back to the Echelle grating. There, the radiation is dispersed another time and only then returns in autocollimation over the mirror to the detector.

DE 103 47 862 B4 discloses an Echelle spectrometer where the radiation dispersed at an Echelle grating is reflected back in the direction of the entrance slit with a small angle. A plane mirror assembly around the entrance slit reflects the dispersed radiation to the Echelle grating again, whereby the radiation is dispersed once more.

With known Echelle spectrometers in autocollimation the radiation is either passed several times over the Echelle grating in order to increase the theoretical resolution and angular dispersion or prisms are used in autocollimation in order to obtain a folding of the beam path and thereby a smaller assembly. It is disadvantageous however, that the light throughput of such spectrometers with assemblies with internal separation of the orders is limited to a large extent. The smallest separation of the orders over the entire spectral range determines the maximum value for the admissible slit height. Compared to spectrometers with diffraction gratings in first order a typical loss of light throughput of a factor 10 to 50 may occur.

DISCLOSURE OF THE INVENTION

It is an object of the invention to provide a compact spectrometer of the above mentioned kind with high resolution and a particularly high light throughput. According to an aspect of the invention this object is achieved in that the dispersion assembly is reflective, and the dispersion assembly is arranged relative to the Echelle grating in such a way that the parallel radiation bundle is reflected in the direction of the Echelle grating and passes the dispersion assembly once more and the imaging mirror focuses the reflected and dispersed parallel beam of rays.

For example, the dispersion assembly can be formed by an assembly comprising a prism spectrally dispersing the radiation in a lateral dispersion direction. Such a prism assembly may comprise a prism which is reflective at its rear side. However, the prism assembly may also comprise a transmission prism with a plane mirror, a reflecting grating, or another prism which is reflective at its rear side, therebehind. The dispersion assembly may also comprise a combination of a grating and a prism, called grism, instead of a prism assembly.

With such an assembly radiation can pass an entrance slit. The divergent radiation will fall on a collimator optics, such as, for example an achromatic lens optics or a concave mirror. Such a mirror may be an off-axis paraboloid, a toroid, or a spheric mirror. An off-axis paraboloid is preferred. A parallel radiation bundle is generated with the collimator optics. Such parallel radiation bundle falls on a reflecting dispersion assembly. In the most simple case such a dispersion assembly is a prism with a reflective rear side. The prism is arranged in such a way that the reflected and dispersed radiation will not be reversed in itself but having an angle in the direction of the Echelle grating. The Echelle grating is arranged in such a way that the radiation is dispersed in a different direction, the main dispersion direction. The main dispersion direction may, in particular, be perpendicular to the lateral dispersion direction. In such a way a two dimensional spectrum is generated in the exit plane.

If the Echelle grating is mounted rotatably about an axis running parallel to the grooves of the grating a selected wavelength or a selected wavelength range may be moved to an exit slit or a detector in the exit plane. The prism may be mounted rotatably about an axis running parallel to the diffraction edge. Thereby, selected orders may be moved to an exit slit or a detector in the exit plane.

The double passage at the prism enables the generation of high dispersion and, thereby, large separation of the orders. This makes it possible to use a high entrance slit. Thereby, the assembly has a relatively large light throughput with high resolution and only few optical components.

In the assembly the Echelle grating is arranged in such a way that the dispersed radiation is reflected back to the dispersion assembly. The assembly operates in autocollimation mode. An autocollimation assembly is understood to be an assembly, where the collimator optics simultaneously acts as a camera optics by reflecting the beam back essentially in itself. The parallel, reversed bundle coming from the Echelle grating passes the dispersion assembly once more. The radiation dispersed again in a lateral dispersion direction runs back to the autocollimation optics. There, the beam is focused in the exit plane.

With such an assembly the radiation is dispersed in a lateral dispersion direction several times. Accordingly, the orders of the Echelle spectrum are particularly well separated. The otherwise limited slit height can be selected to be very large. Only a minimum of optical components is required. The required material volume of the prism is reduced by a factor of 4 in a reflecting assembly and with double passage compared to a transmitting assembly. Thereby, essential cost savings are achieved in particular with expensive crystal materials which are free of streaks.

Apart from the dispersion the dispersion assembly serves to separate the incident from the reflected, parallel beam. Contrary to known autocollimation assemblies he radiation is not reversed in itself by the dispersion assembly but runs to the Echelle grating at first. In a particularly advantageous assembly a very high imaging quality is achieved because the prism deflects and disperses in the main plane. Furthermore, only very few optical components are required which cause only small transmission- and reflection losses. By rotating only two axes the spectrum can be focussed and positioned in the imaging plane while maintaining optimum imaging conditions at the same time. Thereby, the assembly is easy to adjust and inexpensive to produce.

It is understood, that the reflection at the Echelle grating can be effected directly in the direction of the dispersion assembly. Alternatively, the radiation can be directed at first to a mirror, pass the Echelle grating again and only then return back to the dispersion assembly.

In a modification of the invention a further Echelle grating is provided and the dispersion assembly is moveable from a first to a second position, wherein an Echelle grating is allocated to each position and wherein the radiation is reflected in the direction of such Echelle gratings. One of such two Echelle gratings can be selected by a simple rotation of the dispersion assembly. The dispersion characteristics of each of the Echelle gratings can be adjusted to the respective use. It is understood that a third or further Echelle gratings may be provided, also. In such a case the dispersion assembly can be moved in a third or further positions. A plane mirror can be provided instead of one of the two Echelle gratings. A one-dimensional spectrum is generated on the detector with a suitable rotation and illumination of the plane mirror. This can serve as a spectral overview, while afterwards after rotating the dispersion assembly two-dimensional spectra are imaged with high resolution upon illuminating the Echelle grating. Using a detector array the two dimensional spectrum can be simultaneously read out. The second dimension of the detector array can be used for the simultaneous registration of one-dimensional spectra of different radiation sources or for the spacially resolved spectral detection of one radiation source if the plane mirror is illuminated. This is also the case with rotating the dispersion assembly if the radiation is dispersed and directly reflected back from the dispersion assembly to the autocollimation optics.

If the Echelle grating is rotatably mounted a further Echelle grating can be provided at its rear side. The further Echelle grating can have different characteristics, such as, for example, a different amount of grooves. Instead of rotating the prism or in addition thereto the Echelle grating can be rotated by, for example, an angle of 180°. In this case, the further Echelle grating will be used.

In a further modification of the invention the dispersion assembly comprises a prism provided with a reflecting rear side and which is mounted on a rotatable table together with at least one further prism with a reflecting rear side in such a way that one of the prisms can be selected by rotating the rotatable table. In such a way the lateral dispersion can be selected by rotating the rotatable table. Prisms made of different materials having different wavelength dependencies of the dispersion may be used. Also, prisms having different prism angles may be used. Different reflective dispersion assemblies, such as diffraction gratings or grisms may be mounted in combination with the prism on the rotatable table. The rotational axis serves for the selection of the respective lateral dispersion assembly, an Echelle grating or a plane mirror as well as for adjusting the spectrum on the detector.

According to a further modification of the invention a further prism may be arranged in the radiation path. Such a prism may serve to, for example, additionally influence the spectral distribution of the lateral dispersion. The further prism may be positioned, in particular, between the dispersion assembly and the Echelle grating.

The radiation can be deflected from the main plane by a small angle at the dispersion assembly. In this case, the beam runs outside the main plane enabling a detector to be provided in the exit plane above or below the entrance slit. Thereby, the beams of the double passage through the dispersion assembly are separated in the focal plane from beams of the directly reflected simple passage. The assembly then preferably serves to suppress underground- and stray light.

In a further embodiment of the invention a spacial resolving detector array, such as, for example, a CCD-detector is provided in the focal plane. In such a case the assembly is preferably a high resolution spectrograph. In a second embodiment a linear detector or even a single detector, for example a photodiode or a secondary electron multiplier (photomultiplier) is provided in the focal plane. In such a case the assembly is a monochromator with high throughput. Depending on the entrance slit width the device caused resolving power is adjustable in wide ranges.

In a method according to the invention for spectrally dispersing radiation according to the above mentioned kind the parallel radiation bundle is reflected by the dispersion assembly in the direction of the Echelle grating and passes the dispersion assembly once more and the dispersed and reflected radiation is focused with the same collimating optics. The radiation dispersed by the Echelle grating may be reflected back in the direction of the dispersing assembly.

The assembly according to the invention provides in a preferred embodiment of the invention an intensive, monochromatic light source with small band width with very high light throughput if illuminated with a continuum light source. The use of an assembly with a continuum light source and spectrometer enables the tuning over the entire wavelength range without having to change the light source.

In a preferred embodiment of the invention the above described assembly is used for the analysis in VUV-range. This is promoted by the small size of the volume which must be evacuated and minimum losses with few reflections and high transmission.

In order to suppress parasite reflections at the Littrow prism the parameters prism material and deviation angle can be used. They are selected in such a way that no unwanted light is incident on the detector.

Further modifications of the invention are subject matter of the subclaims. An embodiment of the invention are described below in greater detail with reference to the accompanying drawings.

DESCRIPTION OF THE PREFERRED EMBODIMENT

Figure 1:
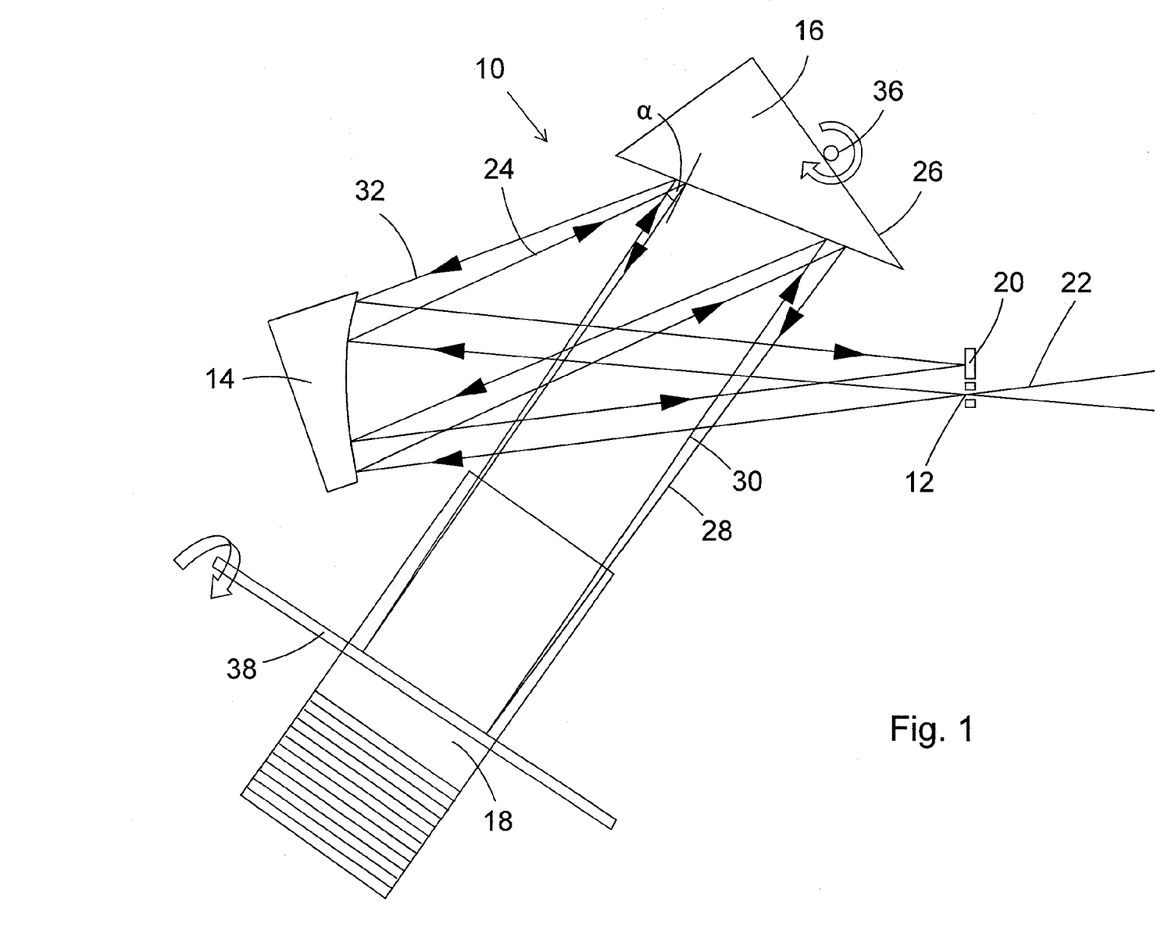
FIG. 1 shows a spectrometer assembly with an Echelle grating and a reflecting prism reflecting parallel radiation in the direction of the Echelle grating.

FIG. 1 is a schematic representation of a particularly simple spectrometer assembly which is generally denoted with numeral 10. The spectrometer assembly comprises an entrance slit 12, an off-axis paraboloid used as a collimator mirror 14, a prism 16 which is reflecting at its rear side, and an Echelle grating 18. A detector 20 is provided in the exit plane of the spectrometer assembly 10 for detecting the generated spectra. The roof edge of the prism 16 extends perpendicular to the representation plane. The grooves of the Echelle grating 18 run in the representation plane.

In addition to the above mentioned, optical components the spectrometer assembly 10 comprises further components, such as a housing, a base plate, fixing- and adjusting means, mechanical drivers and electrical components for controlling the optical components and for detecting and evaluating the signals at the detector 20, such components, however, not being shown for simplicity.

Radiation from a radiation source entering into the spectrometer assembly 10 through the entrance slit 12 is represented by its edge rays 22. The radiation 22 is collimated by the collimator mirror 14 to become a parallel bundle of rays. The parallel bundle of rays 24 falls on the prism 16 with an incident angle α and is there dispersed in the representation plane in a lateral dispersion direction. The bundle of rays runs through the prism 16 to the reflective rear side 26. There, it is reflected and runs back again through the prism. The incident angle α is selected in such a way that the incident bundle of rays 24 is well separated from the reflected bundle of rays 28. The reflected, parallel bundle of rays 28 falls on the Echelle grating 18. There, it is dispersed in a main dispersion direction out of the representation plane.

The Echelle grating 18 is positioned in such a way that apart from a very small angular shift the radiation is reversed back to the prism 16 in the form of a still parallel bundle of rays 30. It is then dispersed again in the lateral dispersion direction, reflected and dispersed once more. The still parallel bundle of rays 32 is then focused by the off-axis mirror 14 which this time forms the camera in the exit plane with the detector 20.

Figure 11:
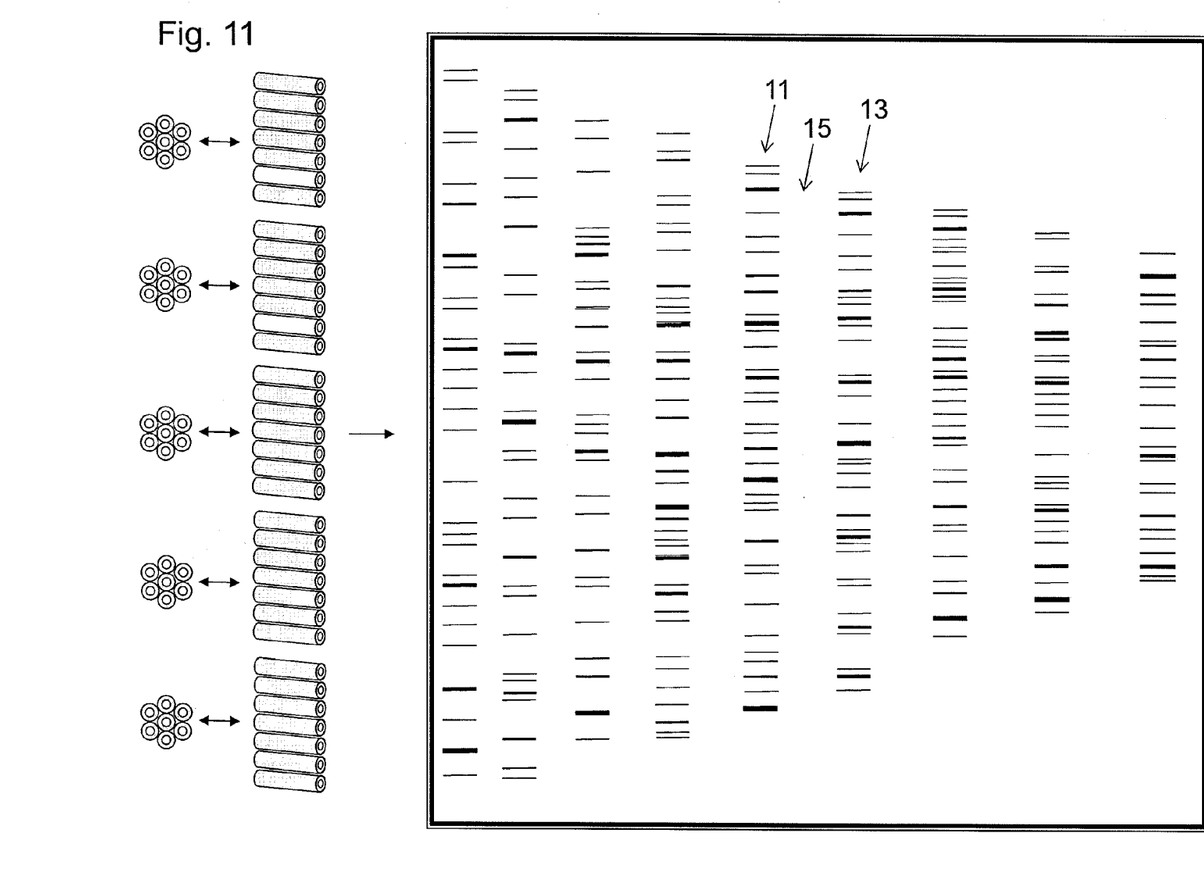
FIG. 11 qualitatively illustrates the simultaneously measured intensity distribution of a line spectrum on a detector array for a spectrometer assembly according to FIGS. 1-5 and 8 for a light source.

The orders generated by the Echelle grating in the exit plane extend perpendicular to the representation plane. Due to the lateral dispersion at the prism 16 they have a relatively large gap between them thereby enabling the entrance slit height in the lateral dispersion direction corresponding to the width in the representation plane in FIG. 1 also to be selected relatively large without the risk of overlapping orders. FIG. 11 shows an example of the two-dimensional intensity distribution of a line emitter in the exit plane of the spectrometer generated in such a way when illuminated with one single optical fiber. The orders 11, 13, etc. run in a perpendicular direction in the representation. There are several orders adjacent to each other. The gap 15 between the orders decreases towards the short wavelength range (on the right side in the representation) corresponding to the dispersion distribution of the prism. A plurality of lines are spectrally separated within each order. The separation occurs in a perpendicular direction in the representation. With line emitters, as they are often used in multi-element atomic absorption spectroscopy a configuration may be chosen where overlapping orders are permitted as long as the individual lines will not overlap.

Figure 9A:
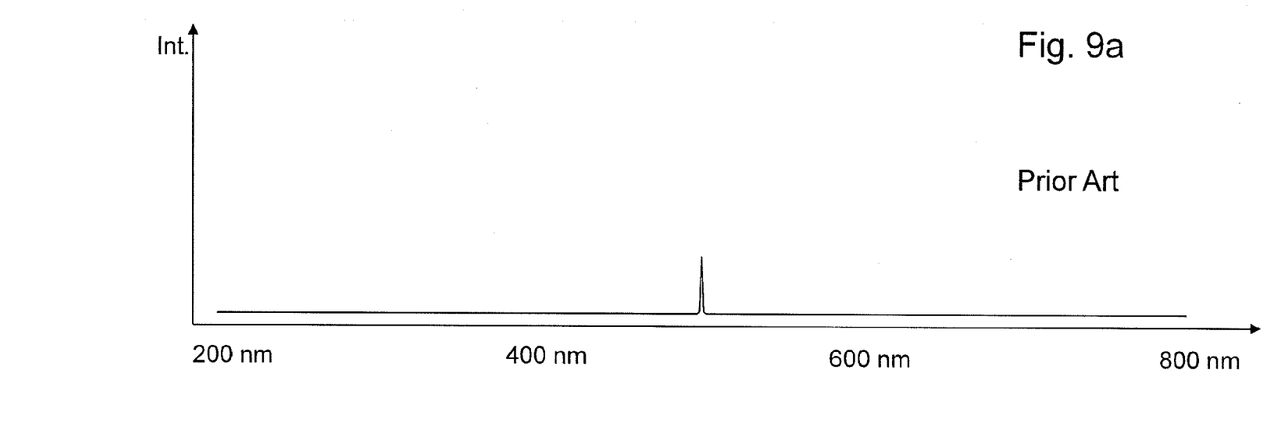
FIG. 9a-b show the spectral intensity distribution of an emission line with small bandwidth at about 500 nm for the assembly according to the invention for high resolution and small entrance slit.
Figure 9B:
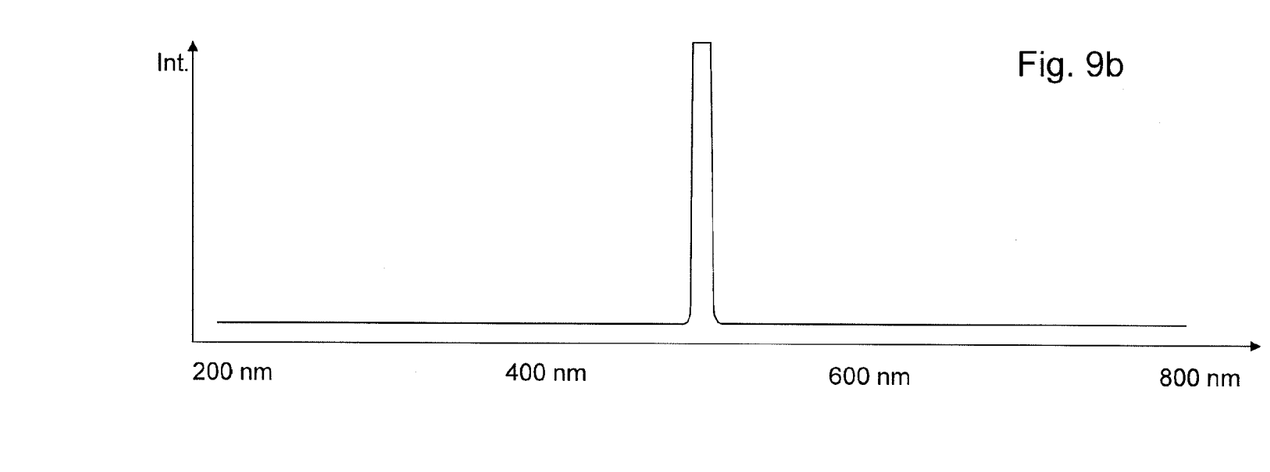

Each position x,y in the exit plane corresponds to one wavelength. FIG. 10 shows the intensity distribution as a function of the wavelength generated by suitable processing. It can be recognized that the lines are well separated in accordance with the high resolution of the Echelle grating. The high intensity of the spectral lines is caused among others by the high light throughput of the assembly. A comparison is shown in FIG. 9. FIG. 9a shows a spectral line generated with an Echelle spectrometer assembly according to the prior art. The slit height is essentially smaller with such line in order to avoid overlapping orders than with the same spectral line as shown in FIG. 9b. The spectral line in FIG. 9b corresponds to the intensity distribution using the assembly according to the present invention in the case of a monochromator/polychromator with extremely large lateral dispersion and large entrance slit opening in both dimensions.

The prism 16 is mounted on a table rotatable about an axis 36 extending perpendicular to the representation plane. This is shown in FIG. 1. The axis 36 is driven by a controllable motor. The orders can be shifted in the lateral dispersion direction by rotation of the prism 16. For example, a selected order can be detected by a line detector in monochromator operation.

The Echelle grating 18 can be rotated about an axis 38 extending parallel to the representation plane. A selected wavelength in a selected order can be shifted to a selected detector element by rotating such axis by means of a controllable motor.

The described assembly requires only very few optical components. This enables the generation of a spectrum with little reflection- and transmission losses. The assembly is inexpensive and easily adjusted. As almost all components are passed b a parallel bundle of rays aberrations are very small. Thereby, the resolution of the assembly is increased. In addition to the small losses at the components and the small aberrations the light throughput is increased by repeatedly dispersing in a lateral direction. This enables a large slit height in the lateral dispersion direction in the case of monochromator use. The assembly is, furthermore, very small and achieves high resolution with a small size.

Figure 2:
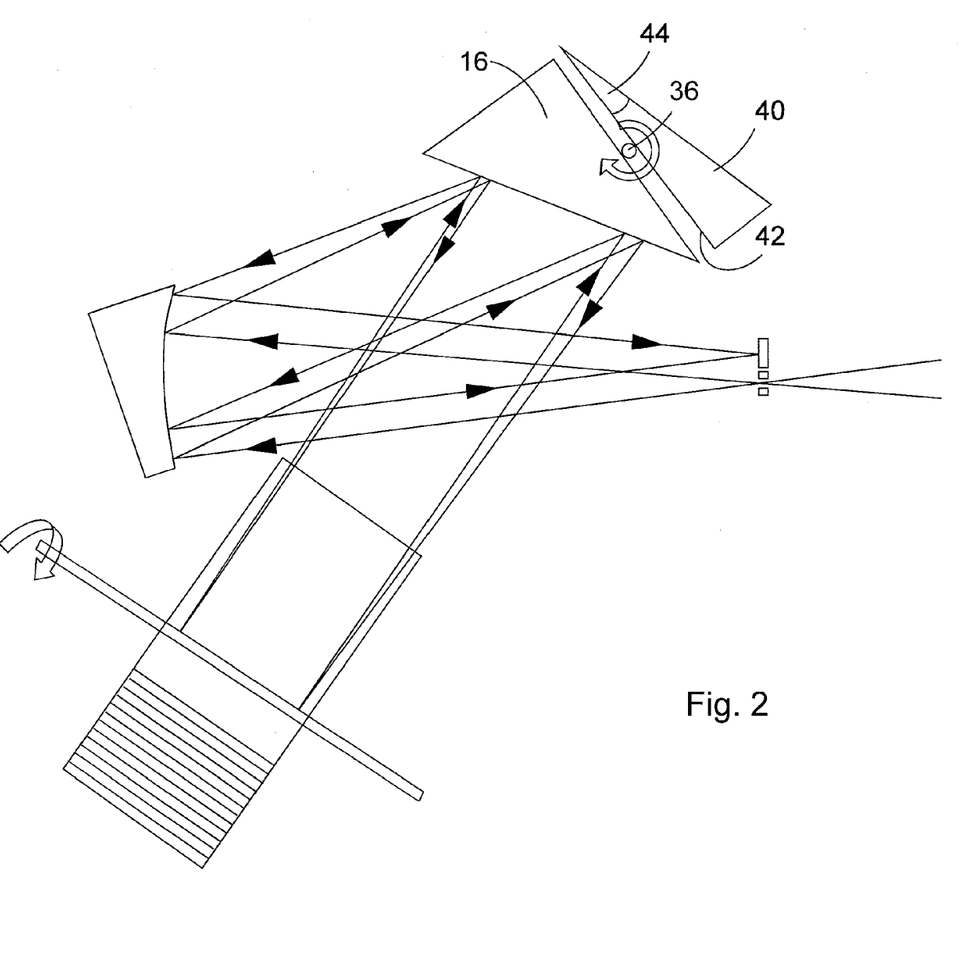
FIG. 2 shows the spectrometer assembly of FIG. 1, where an additional prism with a smaller prism angle can be used as a reflecting prism.

FIG. 2 shows a further modification of the embodiment of FIG. 1. The assembly is essentially the same as the above described embodiment. In addition to the prism 16 a further prism 40 is mounted on the rotatable table. The roof edge of the prism 40 runs parallel to the roof edge of the prism 16. The rear side 42 of the additional prism 42 facing the prism 16 is also reflective. The prism 40 has a smaller prism angle 44 than the prism 16. If the application requires a small lateral dispersion the prism assembly with the prisms 16 and 40 on the rotatable table can be rotated about the axis 36 by an angle of about 180°. Then, the prism 40 is active. A smaller lateral dispersion may be useful if measurements are made in the range of short wavelengths where the prism dispersion is particularly large. The orders are then not separated any wider than admitted by the detektor. Depending on the application a prism made of different material with different transmission- and diffraction characteristics can be used instead of different prism angles.

Figure 3:
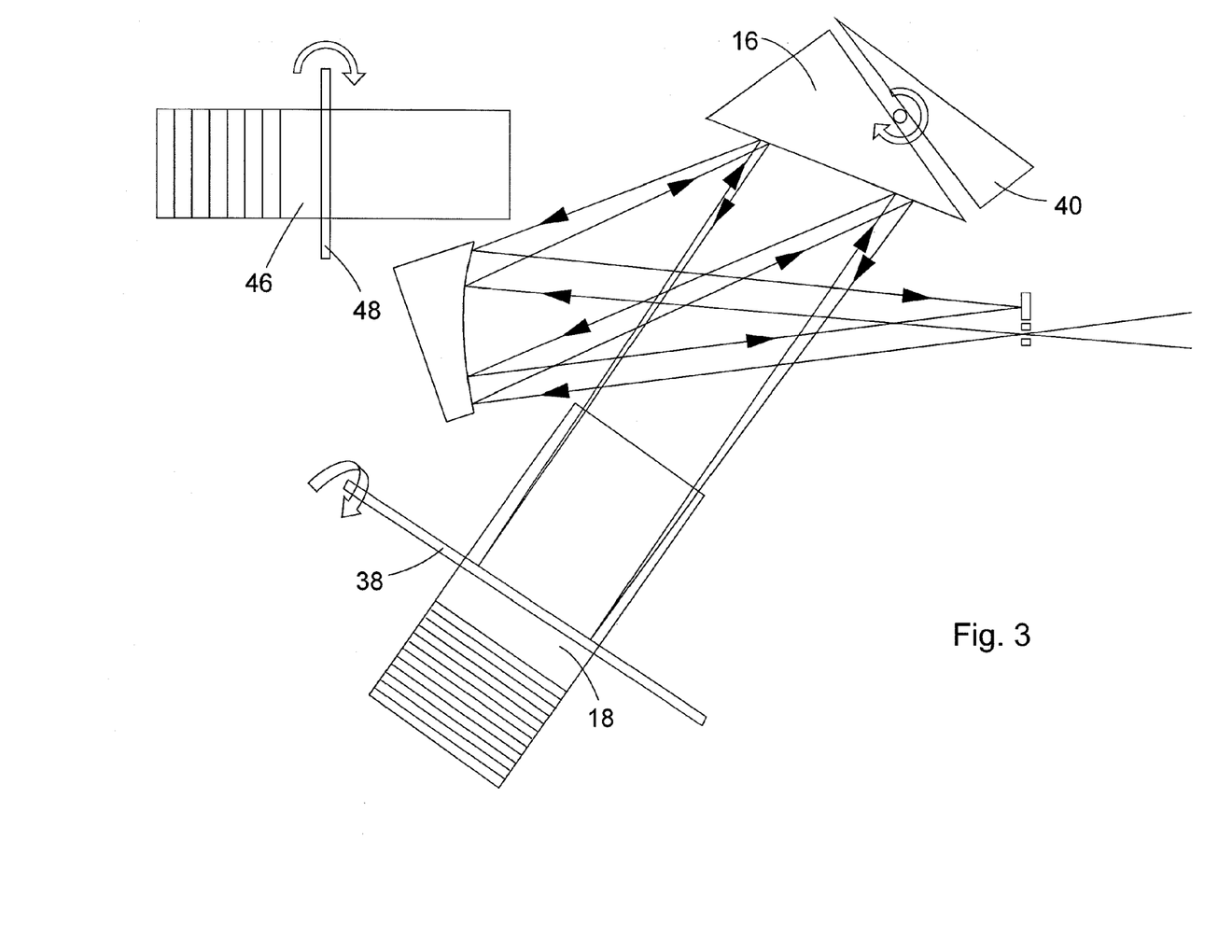
FIG. 3 shows a spectrometer assembly, where there is a selection of two Echelle gratings and two prisms.
Figure 4:
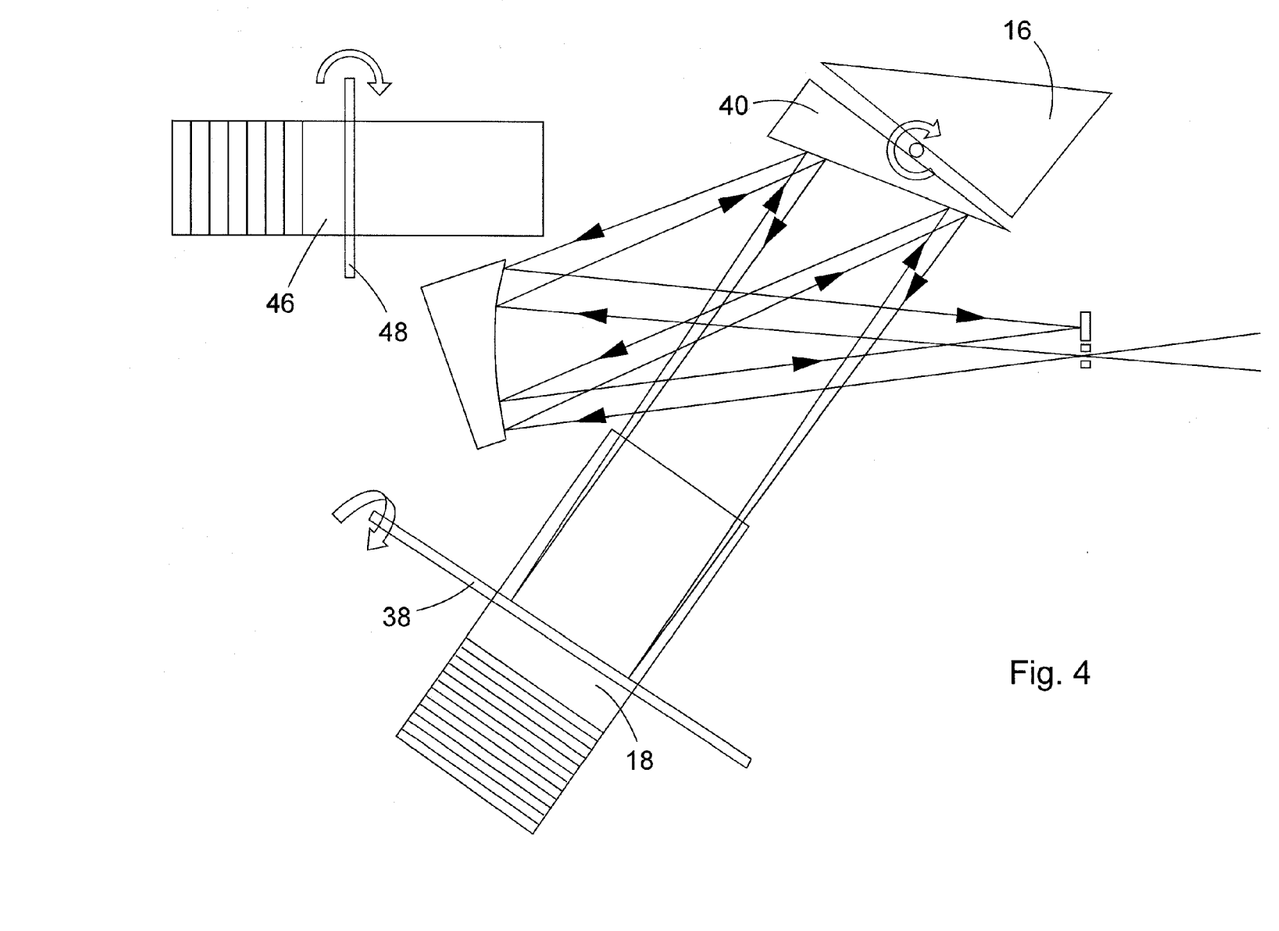
FIG. 4 shows the spectrometer assembly of FIG. 3, where the second prism is used.
Figure 5:
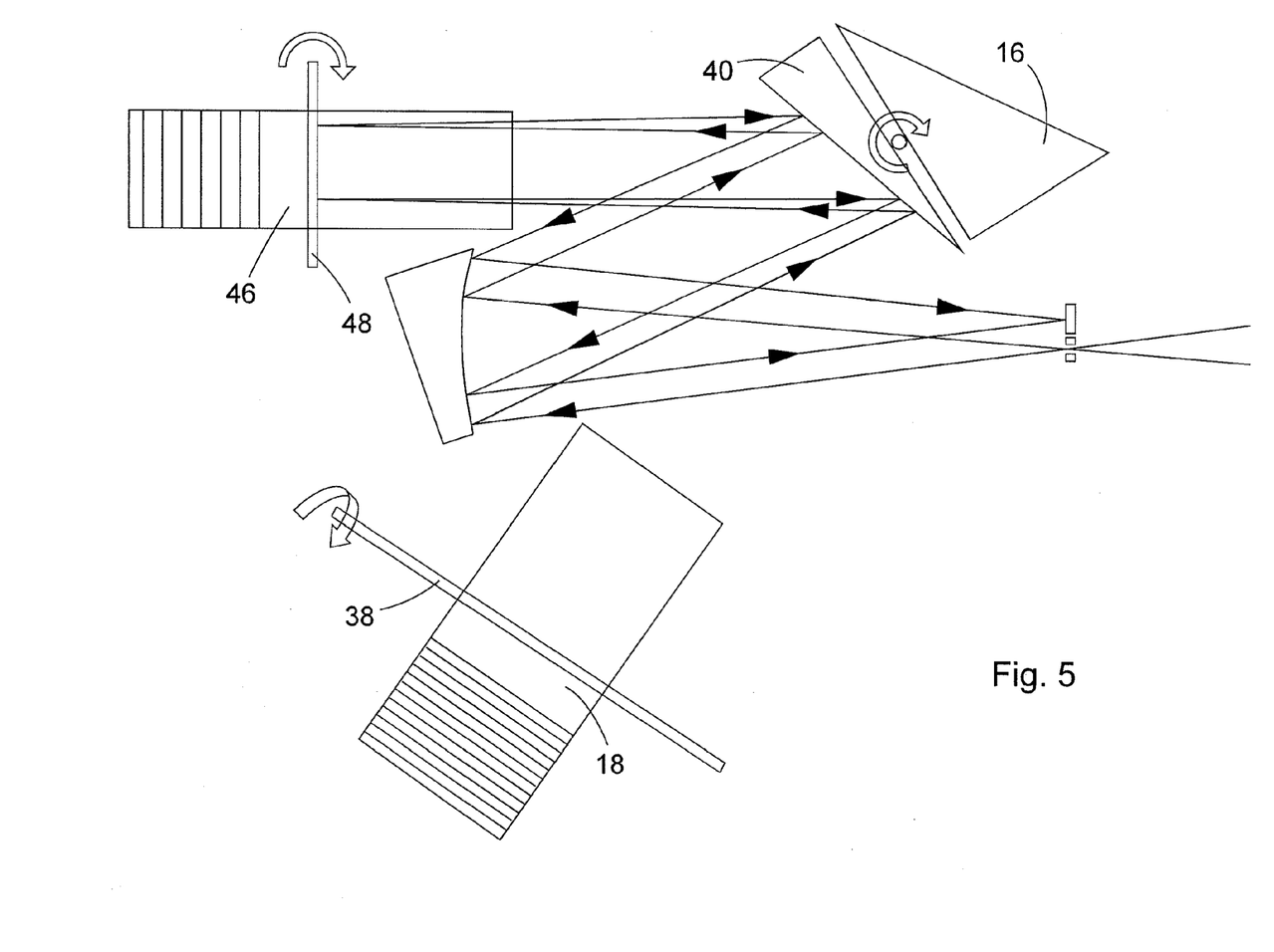
FIG. 5 shows the spectrometer assembly of FIG. 3, where the second Echelle grating is used.

FIGS. 3 to 5 show further modifications of the embodiments of FIGS. 1 and 2. Independent whether one or two prisms are provided a further Echelle grating 46 may be used which has different properties, such as a different amount of grooves or a different blaze angle. Here also the selection of the Echelle grating is taken depending on the desired effect for the respective application. The choice of the Echelle grating 18 or 46 is made by rotating the prism. The representation in FIG. 3 shows the assembly, where the prism has a large prism angle and the Echelle grating 18 is selected. The representation in FIG. 4 shows the assembly where the prism with a smaller prism angle and the Echelle grating 18 have been selected. The representation in FIG. 5 shows the assembly where the prism with the smaller prism angle and the Echelle grating 46 are selected.

Figure 10A:
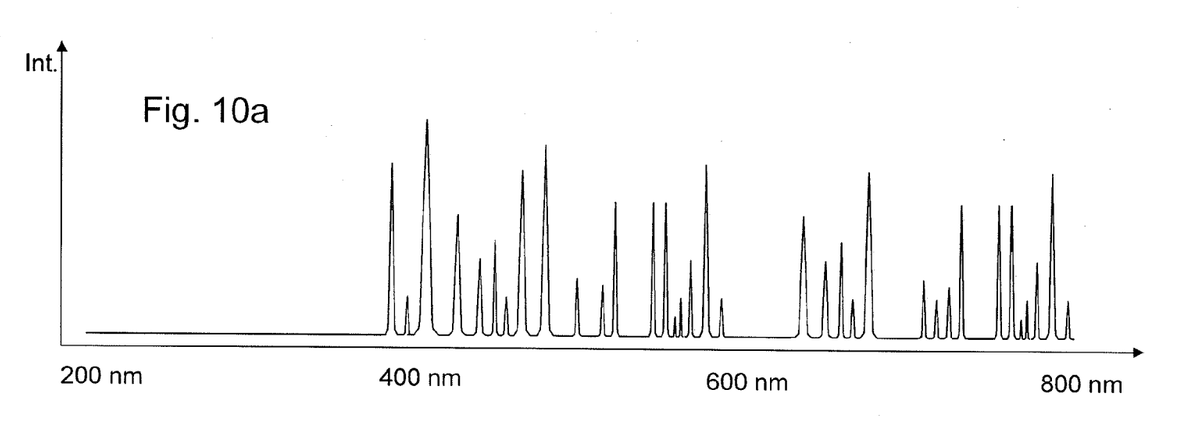
FIG. 10a-b illustrate the influence for the case with high light throughput with large entrance slit.
Figure 10B:
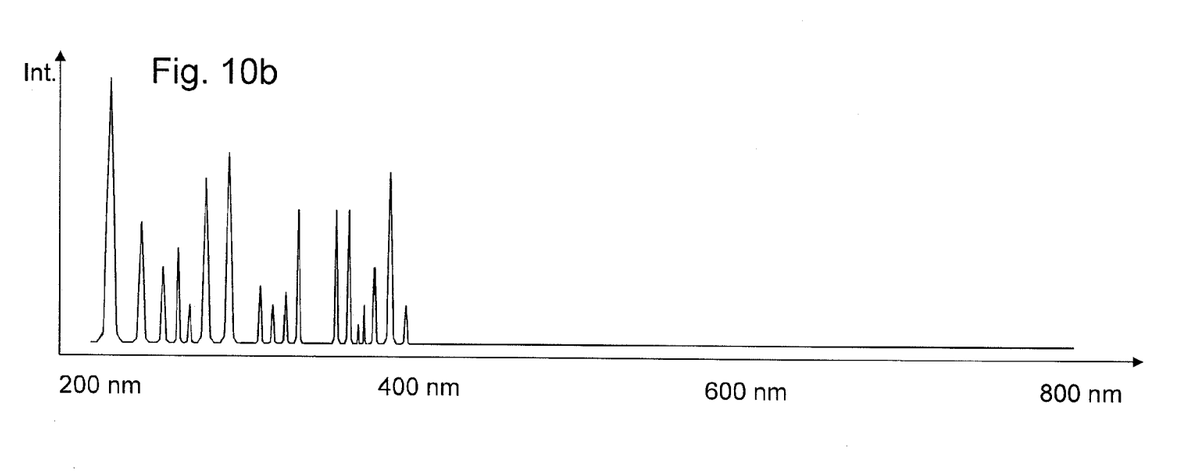

FIG. 10 is an example showing the effects of the change of the Echelle grating. The Echelle grating 18 has a smaller grating constant than the Echelle grating 46. In the present embodiment it is particularly well suited for the short wavelength range below 400 nm. Such an Echelle grating 18 is used with a prism having a relatively large prism angle as shown in FIG. 2. Calcium fluoride has a high transmission in the wavelength range below 400 nm. The large prism angle causes a high lateral dispersion. The assembly of FIG. 2 is, therefore, optimized for the short wavelength range as shown in FIG. 10b. The spectrum schematically shown in FIG. 10a is generated with a configuration where the prism has a small prism angle using flintglass. Such material is particularly suitable for the range above 400 nm. The configuration is shown in FIGS. 4 and 5.

Figure 6:
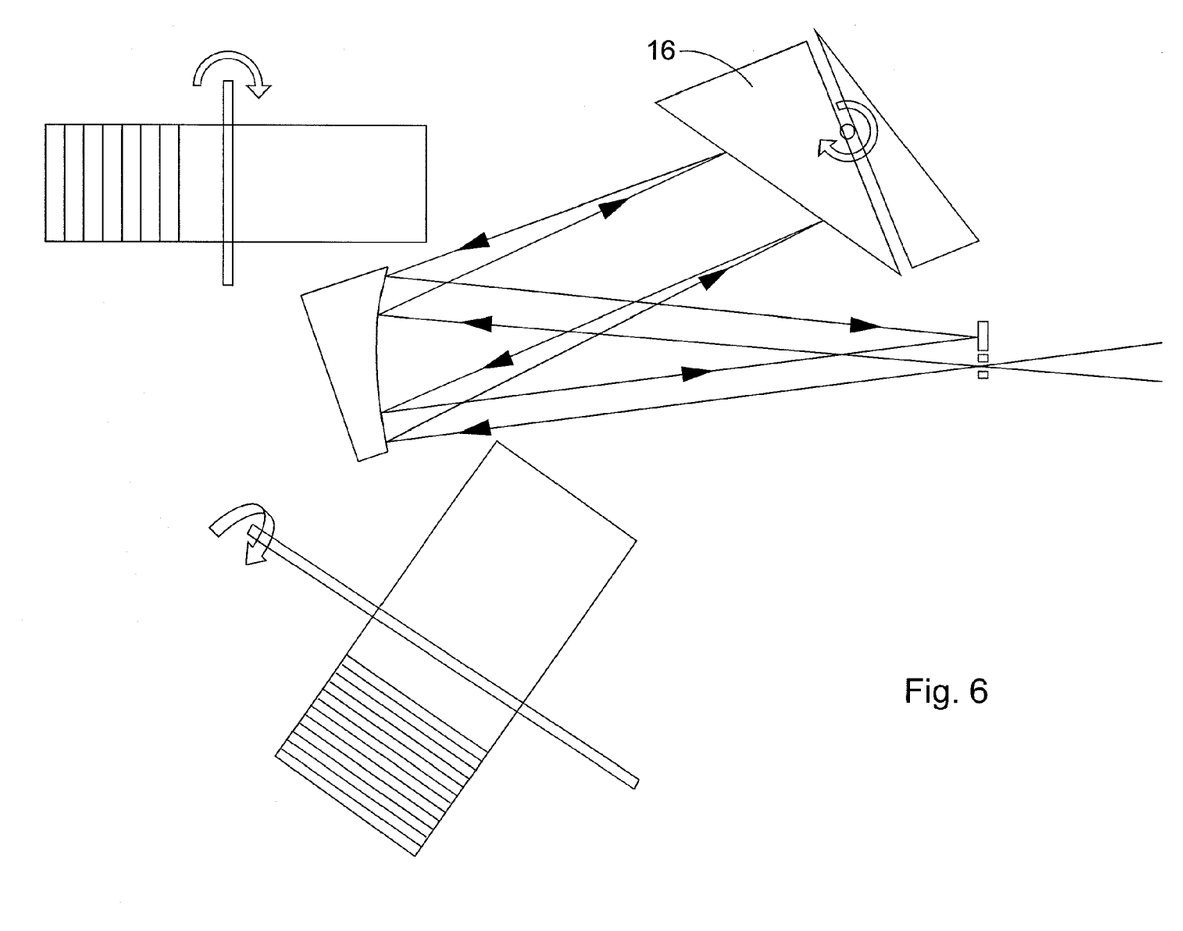
FIG. 6 shows the spectrometer assembly of FIG. 3, where the prism is used in an autocollimation position without using the Echelle grating.
Figure 7:
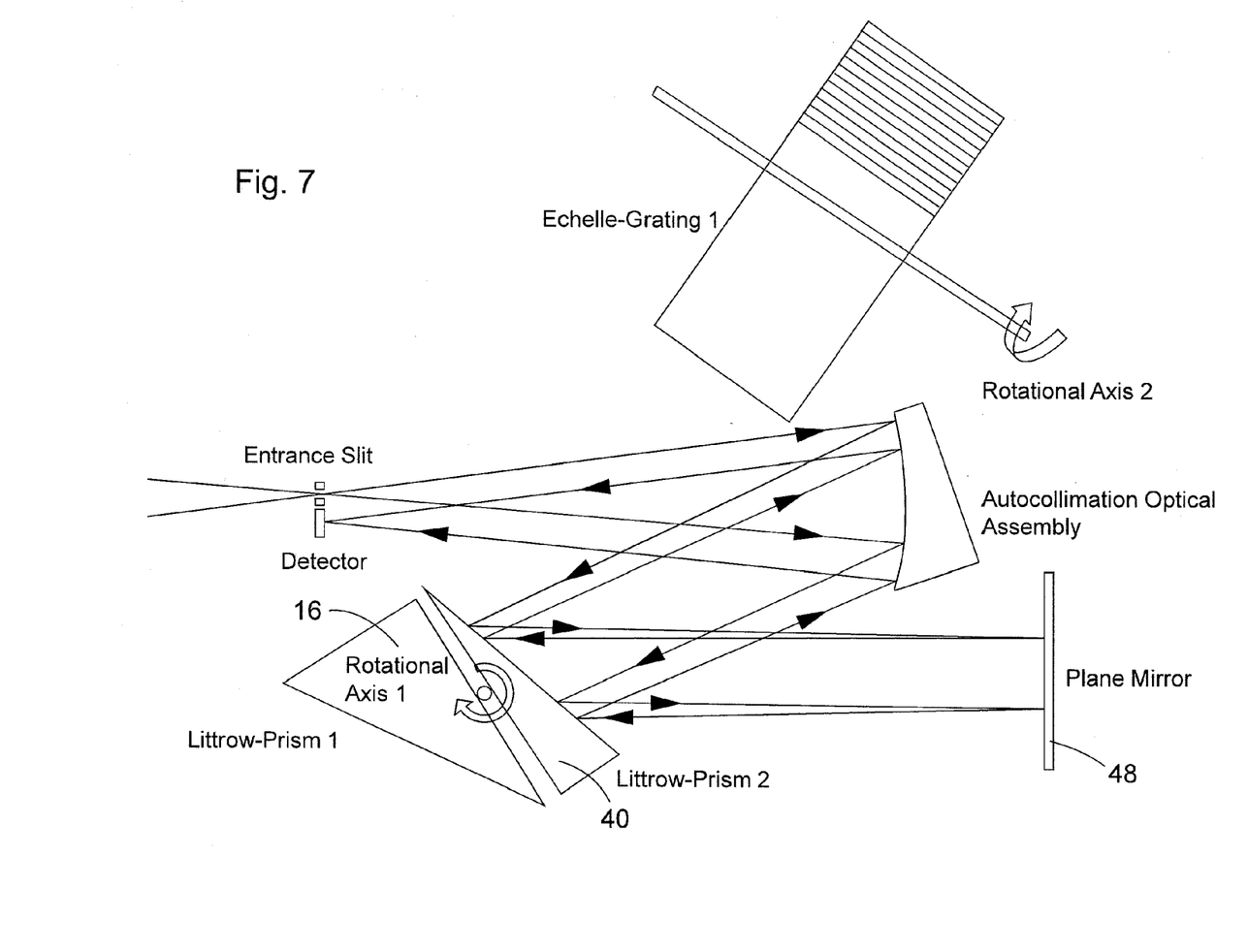
FIG. 7 shows the spectrometer assembly without using the Echelle grating similar to FIG. 6, where the radiation is passed over the prism again by means of a plane mirror.
Figure 8:
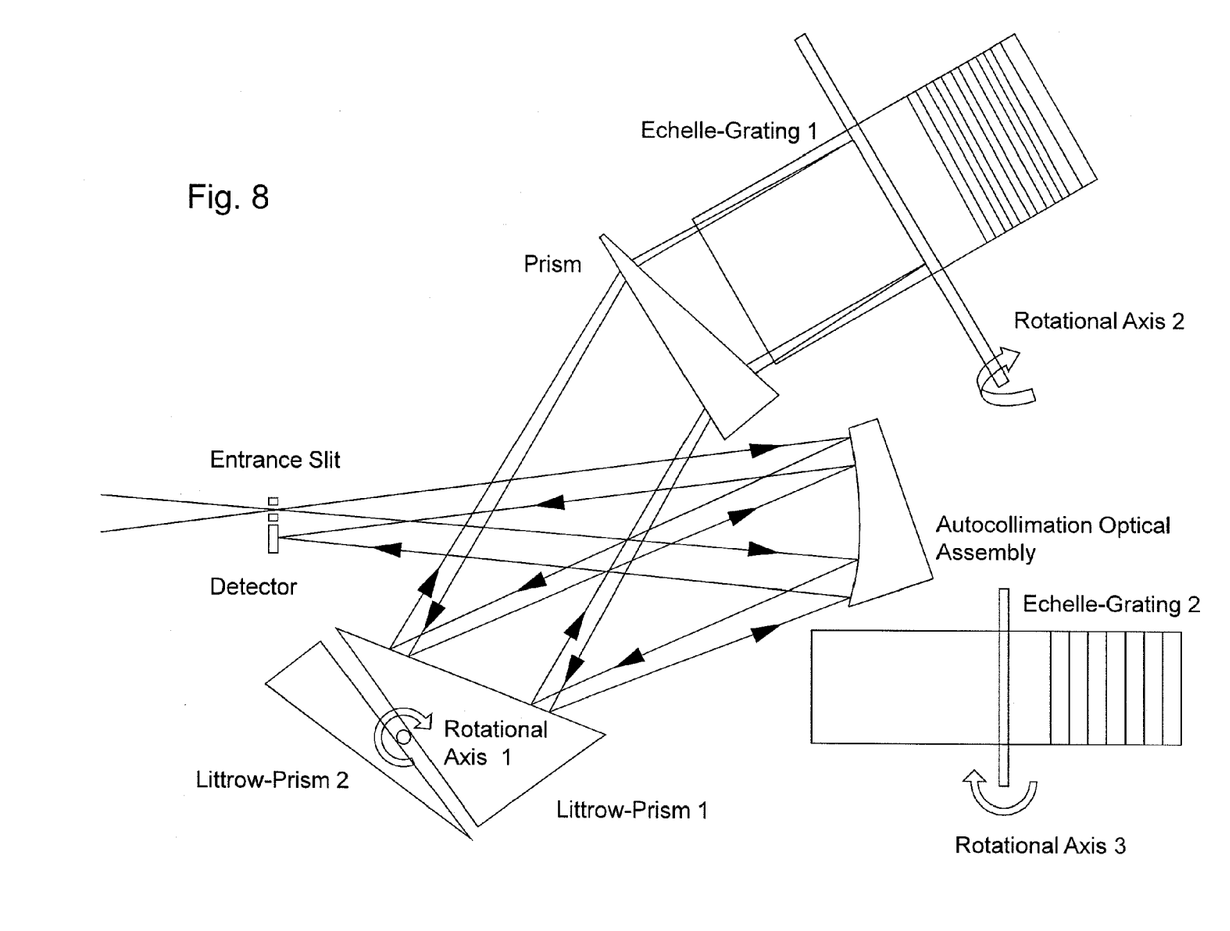
FIG. 8 shows the spectrometer assembly with a prism and an Echelle grating similar to FIG. 3 where an additional transmissive prism is provided in the beam path between the prism and the Echelle grating.

FIGS. 6 and 7 show additional configurations which also may be useful. The prism 16 and 46 are adjusted in such a way that the radiation will not fall onto the Echelle grating at all. In this case only a linear overview of the spectrum with small resolution is generated on the detector. Depending on the desired dispersion the radiation can be directly reflected back to the entrance slit (FIG. 6) or in the direction of a plane mirror 48 (FIG. 7). The radiation is reflected back at the plane mirror 48 in autocollimation and passes the prism 46 again.

Figure 12:
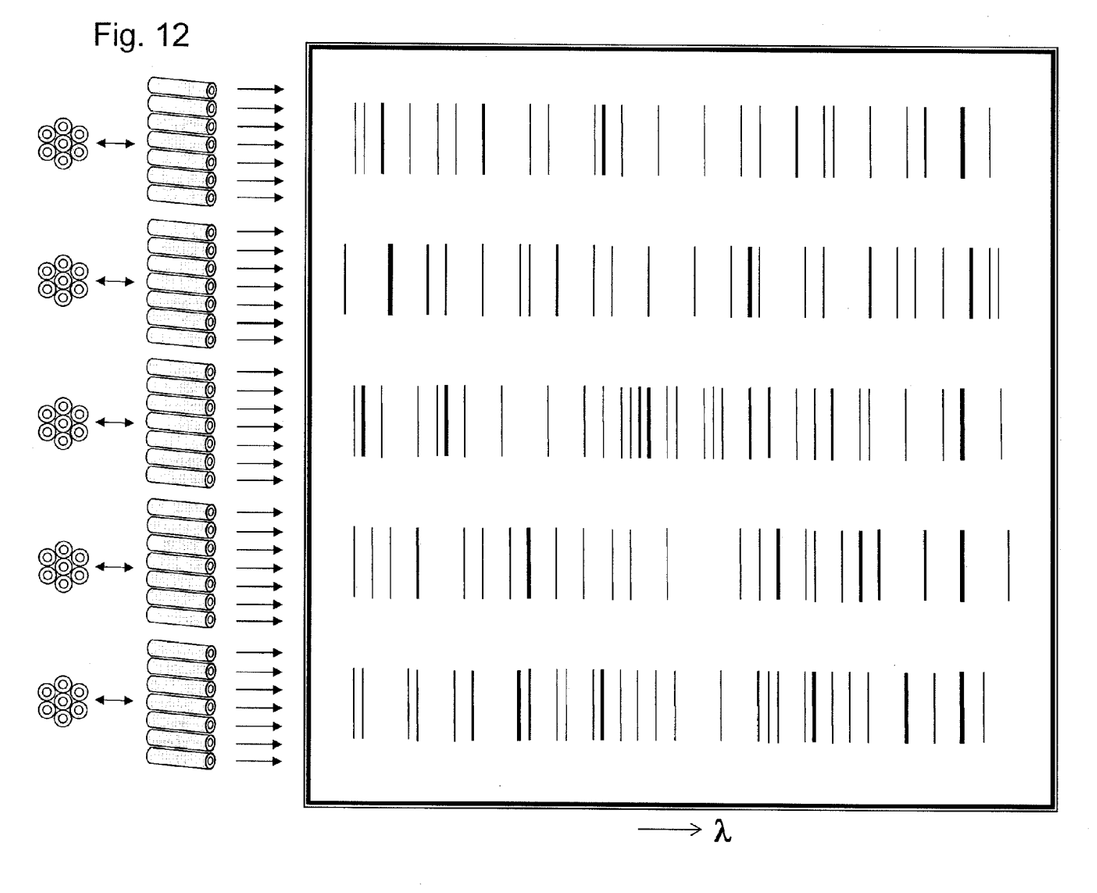
FIG. 12 qualitatively illustrates the simultaneously measured intensity distribution of a line spectrum on a detector array for a spectrometer assembly according to FIG. 6 or 7.
Figure 13:
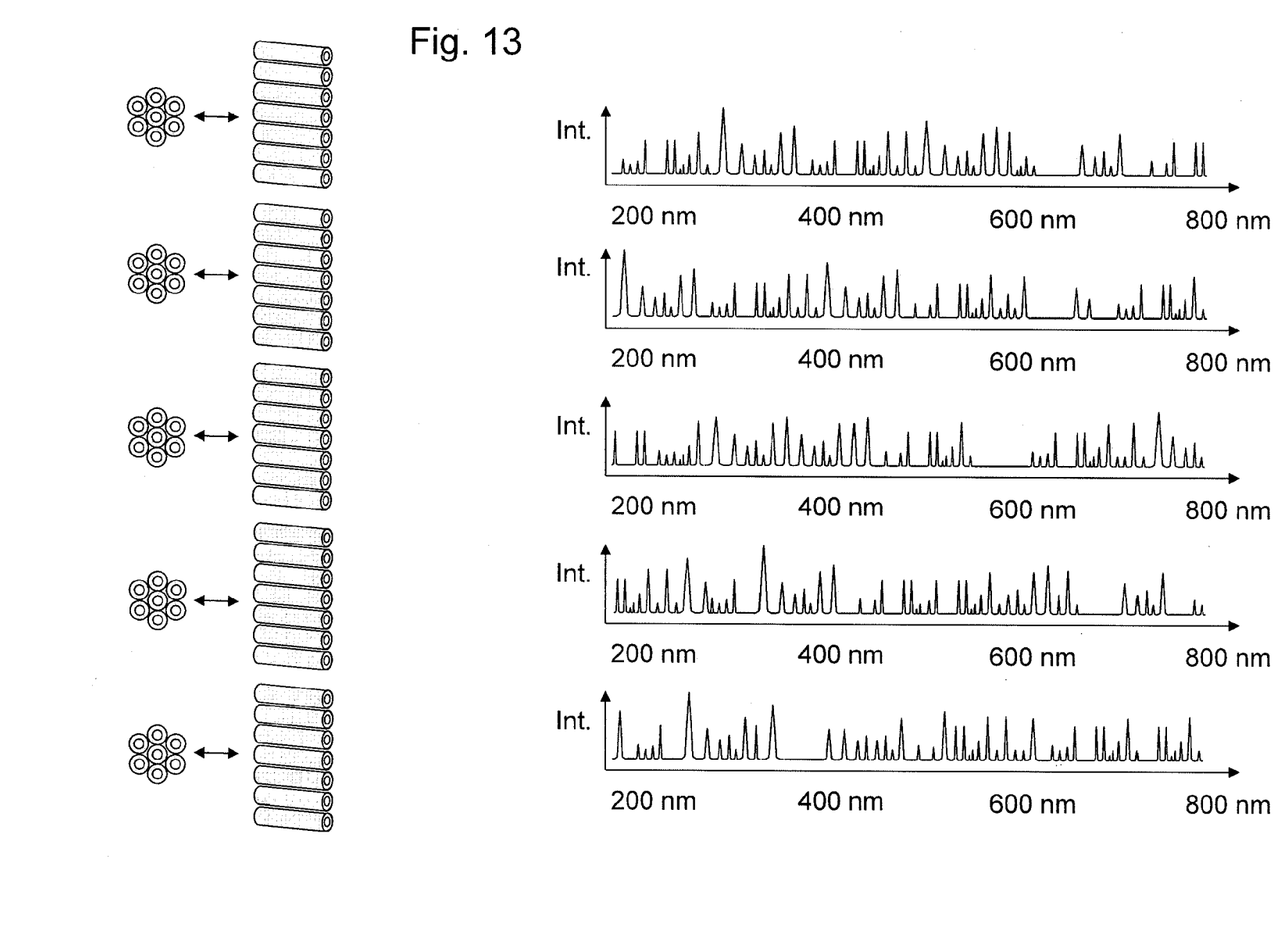
FIG. 13 shows the simultaneously measured spectral intensity distribution of exemplary line spectra emitted by five different light sources.

With assemblies shown in FIGS. 6 and 7 a one-dimensional intensity distribution is generated which is shown in FIG. 12 by way of example. FIG. 12 shows five spectra from different radiation sources. The corresponding spectra are shown in FIG. 13. It can be seen, that the high resolution Echelle spectrometer having a two-dimensional intensity distribution can be switched to a low resolution prism spectrometer having a one-dimensional distribution in order to obtain an overview over the spectral intensity distribution of a radiation source. The use of a detector array in the exit plane enables the use of the non-used dimension for various purposes. The spectral intensity distribution of different light sources can be compared by using preferably fibers, as it is indicated in FIGS. 12 and 13. The spacially resolved spectrum of a light source may also be measured. Finally, detector elements can be binned along the slit height thereby obtaining a particularly high light throughput.

The plurality of variations of the assembly with two or more Echelle gratings and various prisms becomes apparent to the person skilled in the art without the need to show all variations. It is an essential feature of all configurations that they can be obtained simply by rotation of the prism table about the axis 36. Difficult and time consuming exchange of components and translatory movements are not required. In each case a particularly high imaging quality is achieved with high light throughput and high resolution and small costs and size. There are certain applications where it may be useful to rotate individual components of the dispersion assembly about axes running parallel to the axis 36.

The invention claimed is:

1. A spectrometer assembly adapted for radiation to enter said spectrometer assembly and thereby forming an optical path inside said spectrometer assembly, the spectrometer assembly comprising:
   a collimator optics for generating a parallel bundle of rays from said radiation entering said spectrometer assembly,
   a reflective dispersion assembly for dispersing said parallel bundle of rays in a lateral dispersion direction,
   an Echelle grating for dispersing radiation entering said spectrometer assembly in a main dispersion direction, said main dispersion direction being different than said lateral dispersion direction, wherein
   said dispersion assembly is arranged along said optical path before said Echelle grating in such a way that said parallel bundle of rays is reflected in the direction of said Echelle grating and wherein
   said Echelle grating is arranged in such a way that said dispersed radiation is reflected back to said dispersion assembly and passes said dispersion assembly once more, and
   said collimator optics focuses said reflected, dispersed parallel bundle of rays.

2. The spectrometer assembly of claim 1, and further comprising a further Echelle grating and Wherein said dispersion assembly is moveable from a first to a second position, and wherein each one of said Echelle gratings is allocated to one of said first and second positions and wherein said radiation is reflected in the direction of said Echelle gratings.

3. The spectrometer assembly of claim 2, and wherein said radiation is deflected by a small degree from the a main plane.

4. The spectrometer assembly according of claim 2, and wherein in addition to said dispersion assembly a prism is arranged in said radiation path.

5. The spectrometer assembly of claim 2, and wherein said dispersion assembly comprises a prism provided with a reflecting rear side and is mounted on a rotatable table together with at least one further prism with a reflecting rear side in such a way that one of said prisms can be selected by rotating said rotatable table.

6. The spectrometer assembly of claim 1, and wherein said dispersion assembly comprises a prism provided with a reflecting rear side and is mounted on a rotatable table together with at least one further prism with a reflecting rear side in such a way that one of said prisms can be selected by rotating said rotatable table.

7. The spectrometer assembly of claim 6, and wherein said radiation is deflected by a small degree from the a main plane.

8. The spectrometer assembly according of claim 6, and wherein in addition to said dispersion assembly a prism is arranged in said radiation path.

9. The spectrometer assembly of claim 1, and wherein in addition to said dispersion assembly a prism is arranged in said radiation path.

10. The spectrometer assembly of claim 9, and wherein said radiation is deflected by a small degree from the a main plane.

11. The spectrometer assembly of claim 1, and wherein said radiation is deflected by a small degree from a main plane.

12. A method for spectrally dispersing radiation comprising the steps of:
    generating a parallel radiation bundle with a collimator optics;
    dispersing said radiation with an Echelle grating in a main dispersion direction; and
    dispersing said parallel radiation bundle with a dispersing assembly in a lateral dispersion direction, said lateral dispersion direction being different than said main dispersion direction;
    wherein said parallel radiation bundle is reflected by said dispersion assembly in the direction of said Echelle grating and passes said dispersion assembly once more, and wherein
    said radiation bundle dispersed by said Echelle grating is reflected back in said direction of said dispersing assembly, and
    said dispersed and reflected radiation is focused with said same collimating optics.

* * * * *